(12) United States Patent
Bingham et al.

(10) Patent No.: US 6,324,517 B1
(45) Date of Patent: Nov. 27, 2001

(54) MEETING SITE SELECTION BASED ON ALL-INCLUSIVE MEETING COST

(75) Inventors: Glenn Bingham; Craig Martin, both of Henderson, NV (US)

(73) Assignee: GetThere Inc., Menlo Park, CA (US)

( * ) Notice: Subject to any disclaimer, the term of this patent is extended or adjusted under 35 U.S.C. 154(b) by 0 days.

(21) Appl. No.: 09/241,399

(22) Filed: Feb. 2, 1999

Related U.S. Application Data

(60) Provisional application No. 60/115,521, filed on Jan. 12, 1999.

(51) Int. Cl.[7] .................................................. G06F 17/60
(52) U.S. Cl. .................................. 705/8; 705/1; 705/400
(58) Field of Search ................................. 705/1, 7, 8, 9, 705/400

(56) References Cited

U.S. PATENT DOCUMENTS

| | | | |
|---|---|---|---|
| 4,445,181 | * | 4/1984 | Yatman ................................. 705/418 |
| 4,885,685 | | 12/1989 | Wolfberg et al. . |
| 5,053,956 | * | 10/1991 | Donald et al. ....................... 713/601 |
| 5,799,286 | * | 8/1998 | Morgan et al. ........................ 705/30 |
| 5,832,453 | * | 11/1998 | O'Brien .................................... 705/6 |
| 5,948,040 | | 9/1999 | DeLorme et al. . |
| 6,009,408 | | 12/1999 | Buchanan . |

FOREIGN PATENT DOCUMENTS

| | | | |
|---|---|---|---|
| 11-227369 | * | 8/1999 | (JP) . |
| WO 95/26007 | * | 9/1995 | (WO) . |
| WO 99/01822 | | 1/1998 | (WO) . |

OTHER PUBLICATIONS

"Corp. America Is Mad As Hell": Business Travel News, Sep.14, 1992, p. 1.*
Written Opinion for PCT/US00/00424, mailed Dec. 22, 2000, 2 pgs.
eventsource.com, pp. 1–7.
Boston Handbook on Meeting Technology, pp. 1–16.
Meeting Planning Management Program, pp. 1–3.
The Meeting and Event Planning Center, pp. 1–4.
Eventsource.com, pp. 1–3.
Hotrateshotdates.com, pp.1–2.
Madsearch.com, pp.1–7.
Meetingpath.com, pp. 1–4.
Meetingcity.com, pp. 1–4.
Plansoft.com, pp. 1–4.
CEO Software, Inc. (Company Information), pp. 1–3.
Welcome to Planit Online, pp. 1–6.
Association for Computing Machinery, Conference Paper, pp. 1–7.
C. Finkel, "Professional Guide to Successful Meetings," Successful Meetings Magazine, 1976, pp. 165–166.
J. Huisingh et al., "New Travel Software Saves Time, Money," Dimension, Sep./Oct. 1998, p. 19.
E. Cipriano, "Software Eases Pain of Picking Cost–Effective Sales," Meeting News, Feb. 15, 1999, vol. 23, No. 2, pp. 1,6.

* cited by examiner

*Primary Examiner*—Edward R. Cosimano
(74) *Attorney, Agent, or Firm*—Blakely, Sokoloff, Taylor & Zafman

(57) ABSTRACT

Meeting or conference facilities are evaluated based on an all-inclusive meeting cost. The all-inclusive meeting cost is used to rank the facilities based on the lowest all-inclusive meeting cost or on highest quality below a maximum cost. Meeting planners can then compare total meeting cost at facilities with different characteristics, and find the facilities that offer the most value. An application server is used to calculate all-inclusive meeting cost from a comprehensive database of cost factors. The list of generated meeting facilities and their costs can be generated quickly for a large number of potential meeting facilities.

29 Claims, 15 Drawing Sheets

```
Method Calculate()
    Parameters:    PropertyArrays, ConferenceArray, AttendeeArray, MealArray,
                   TransportationArrays, OriginArrays (officeArray & AirportArray), MetroArray,
                   and UserProfile
    For each property in PropertyArrays
        Store transportation cost between property and each airport it serves in AirTranArray
        Store filtered values from PropertyArrays to FilterVAlue
        Store guestroom rate + applicable taxes from PropertyArray to LodgeCost
        Store effective date to PropStart and PropEnd
        Store quality from PropertyArrays to Quality
        For each valid meal cost in MealArray where
            (EffectiveStart = Max (PropStart, MealStart)) < (EffectEnd = Min (PropEnd, MealEnd))
            Store individual meal cost for property to MealCost
                MealCost = Breakfast + Lunch + Dinner + Incidentals – Complimentary Meals
            If MealCost + LodgeCost for an attendee > MaxCost from UserProfile
                Skip to next meal cost
            EndIf
            Call GetDist
            Store total meal cost to TotalMeal
                TotalMeal = (OnTime x MealCost x (NumDays – ((1 – FirstDay%) + (1 –
                LastDay%)))) + ((Visitors – OnTime) x MealCost x ((NumDays + 1) – ((1–
                FirstDay%) + (1 – LastDay%)))) + Local x NumDays x LocalMeal%)
            Store total lodging cost to TotalLodge
                TotalLodge = (OnTime x (NumDays-1) x LodgeCost) + ((Visitors – OnTime) x
                NumDays x LodgeCost)
            For each office in OfficeArray where distance to Hotal < MaxOfficeDist in MetroArray
                Store local transportation cost to LocalTrans
                    LocalTrans = 0 if free shuttle from Hotel to Office is available, otherwise
                    LocalTrans = Min ((Distance x Taxi), AltOffTrans)
                Call TransCost Method and store result in TotalTrans
                Store all-inclusive meeting cost to TotalCost
                    TotalCost = (1 + MiscExpense) from UserProfile x (TotalTrans + TotalMeal
                    + TotalLodge)
                Store current results to OfficeResultsArray
                    This includes HotelID, OfficeID, RateID, MealID, TotalCost, Quality, FilterValue,
                    Visitors, OnTime, EffectStart, EffectEnd
            Endfor
            Store 0 to LocalTrans
            Call TransCost Method and store result in TotalTrans
            With least expensive conference room in ConferenceArray which meets meeting
            requirements where (TotalStart = Max (EffectStart, ConfStart)) < (TotalEnd = Min
            (EffectEnd, ConfEnd))
                Store conference room cost to ConfCost
                    ConfCost = (ConfRate x NumDays)
                Store all-inclusive meeting cost to TotalCost
                    TotalCost = (1 + MiscExpense) from UserProfile x (TotalTrans + TotalMeal
                    + TotalLodge + ConfCost)
                Store current results to HotelResultsArray
                    This includes HotelID, RateID, MealID, ConfID, TotalCost, Quality, FilterValue,
                    Visitors, OnTime, TotalStart, TotalEnd
            Endwith
        Endfor
    Endfor
EndMethod (Return OfficeResultsArray, HotelResultsArray)
```

FIG. 6A

```
Method TransCost()
    Parameters:    PropLatitude from PropertyArrays, PropLongitude from PropertyArrays
                   AirTranArray, AttendeeArray, TransportationArrays (AirfareArray), MetroArray
                   UserProfile and LocalTrans
    For each attendee group in AttendeeArray
        Store number of attendees in each group to NumAttendees
        If Distance > maximum driving distance
            Increment TotalAir with total airfare cost
                Take min airfare between all airport pairs from origin to destination:
                    Min( ((OneWayAir + OriginTrans + DestTrans) + (LocalTrans x NumDays)) x
                        (NumAttendees x 2)
        Else
            If Distance > LocalDist
                Store distance from hotel to office to OffDist
                Increment TotalDrive with DriveCost
                    DriveCost = ((Distance + (OffDist x NumDays)) + MileReimburse) x
                        (NumAttendees x 2)
            Else
                Increment TotalDrive with LocalDrive
                    LocalDrive = ((Distance x MileReimburse) + LocalTrans) x (NumAttendees x
                        NumDays x 2)
            EndIf
        EndIf
    EndFor Store TotalAir + TotalDrive to TotalTrans
EndMethod (Return TotalTrans)
```

602

```
Method GetDist()
    Parameters:   AttendeeArray, PropLatitude, PropLongitude, OriginArrays For each attendee group in AttendeeArray
        Store distance between origin point and property to Distance in AttendeeArray
            Distance can be calculated using latitude and longitude of the property and the origin
        If Distance < LocalDist
            Increment Local with number of attendees in attendee group Else
            Increment Visitors with number of attendees in attendee group
            If Distance < ExtraDayDist
                Increment OnTIme with number of attendees in attendee group
            Else
                Increment ExtraDay with number of attendees in attendee group
            EndIf
        EndIf
    EndFor
```

Search Results – For Selection Report

Preferred Date 3/17/99

Sorted by
- ● Lowest Cost (3+
- ○ Highest Quality ( etings Held At  1303

Hotel/Conference Facility
Office/Military Base

Request Amenities

☐ ☐ ☐ ☐ ☐ ☐ ☐ ☐ ☐ ☐

[ OK ]  [ Cancel ]

Hotels/Conference Facilit

| Select | Property – Location | Quality Rating | Special Rate Dates | Estimated Total Cost* |
|---|---|---|---|---|
| ☐ 1. | Travelodge Main Gat | 3 | Feb 1 – Apr 30 | $4,695 |
| ☐ 2. | Holiday Inn Cypress | 3 | Jan 1 – Apr 30 | $4,708 |
| ☐ 3. | Days Inn Rocky Point | 3 | Jan 1 – Apr 30 | $4,728 |
| ☐ 4. | DaysInn St. Petersbu | 3 | Jan 1 – Apr 30 | $4,786 |
| ☐ 5. | Best Western Clearv | 3 | Jan 1 – Apr 30 | $4,821 |
| ☐ 6. | Comfort Inn – Orland | 3 | | $4,824 |
| ☐ 7. | Days Inn Cocoa – Co | 3 | | $4,903 |
| ☐ 8. | Holiday Inn Central P | 3 | | $5,041 |
| ☐ 9. | Comfort Inn – Hollyw | 3 | Jan 1 – Apr 30 | $5,069 |
| ☐ 10. | Tampa Airpot Hilton at Metrocenter – *Tampa, FL* | 3 | Jan 1 – Apr 30 | $5,084 |
| ☐ 11. | Hampton Inn of Sarasota – *Sarasota, FL* | 3 | Jan 1 – Apr 30 | $5,254 |

Search Results - For Selection Report

Preferred Date 3/17/99

Sorted by
- ● Lowest Cost (3+ stars)
- ○ Highest Quality (within Per Diem)

Meetings Held At
- ● Hotel/Conference Facility
- ○ Office/Military Base

Hotels/Conference Facilities Ordered by Lowest Cost

| Select | | Property - Location | Quality Rating | Special Rate Dates | Estimated Total Cost* |
|---|---|---|---|---|---|
| ☐ | 10. | Tampa Airpot Hilton at Metrocenter - *Tampa, FL* | 3 | Jan 1 - Apr 30 | $5,084 |
| ☐ | 18. | Orlando Marriott - *Orlando, FL* | 3 | | $5,518 |
| ☐ | 20. | Comfort Inn & Suites - *Miami, FL* | 3 | Jan 1 - Apr 30 | $5,567 |
| ☐ | 22. | Sheraton University Inn - *Orlando, FL* | 3 | | $5,626 |
| ☐ | 25. | Quality Inn - *Naples, FL* | 3 | Jan 1 - Apr 30 | $5,674 |
| ☐ | 40. | Best Western McCarran House Inn - *Sparks, NV* | 3 | | $6,486 |
| ☐ | 64. | Continental Plaza Los Angeles Airport - *Los Angeles, CA* | 3 | | $6,930 |
| ☐ | 72. | Flamingo Resort - *Santa Rosa, CA* | 3 | | $7,048 |
| ☐ | 91. | Embassy Suites - *Phoenix, AZ* | 3 | Jan 1 - Apr 30 | $7,205 |
| ☐ | 103. | Holiday Inn - *Oklahoma, City, OK* | 3 | | $7,317 |
| ☐ | 106. | Holiday Inn - *Phoenix, AZ* | 3 | Jan 1 - Apr 30 | $7,346 |

MEETING SITE SELECTION BASED ON ALL-INCLUSIVE MEETING COST

CROSS-REFERENCE TO RELATED APPLICATIONS

This application claims the benefit of U.S. Provisional Application No. 60/115,521, entitled "Method for Selecting Meeting Sites Based on All-inclusive Meeting Cost," filed on Jan. 12, 1999.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention

This invention relates to methods and systems for meeting and event planning, and more particularly, to a method and system for selecting facilities (both hotels and meeting space) for holding meetings, conferences, conventions, trade shows, special events, and other group-related events.

2. Description of the Related Art

For any given meeting or conference, there are almost always several hundred, if not thousands, of meeting sites that could adequately host the meeting. A person charged with selecting a meeting site typically goes through a five-step process: (1) choosing the preferred dates for the meeting; (2) choosing a specific geographic location-generally a specific city-for the meeting; (3) determining what amenities the facilities must offer to be considered for the meeting; (4) locating meeting facilities that meet the location and amenity requirements and requesting bids or quotes from them; and (5) evaluating the bids based on a simple cost evaluation (i.e., lower bids are usually better).

The typical five-step process is designed to narrow, as quickly as possible, the number of meeting facilities the planner must evaluate, which means that the planner may never seriously consider a large number of sites that may be suitable for the meeting. Ideally, before choosing a geographic location and preferred amenities, planners would evaluate each potential facility in search of the most ideal, or highest value facility, where value refers to the most benefit, as defined by the meeting planner, for the price. For example, the highest value meeting site typically offers the best combination of location, amenities, and quality of service.

As used herein, a meeting site or meeting facility refers to the hotel where the out-of-town attendees lodge and the location at which the attendees gather. This definition is useful because: (1) the hotel and the meeting location are very often the same facility; and (2) the choice of the hotel and the meeting location are almost always made hand-in-hand (i.e., if they are not the same facility, the hotel will be close to the property providing the meeting space—at a minimum they will be in the same city).

The conventional, above-described manual method of selecting a meeting facility is sub-optimal. There are at least three reasons for this.

First, manual methods fail to identify the meeting facility that offers the most value. Because planners eliminate so many facilities based on geography and amenities, they never seriously evaluate many potential facilities. Furthermore, planners do not consider the all-inclusive cost (travel, lodging, meals, meeting space, and incidentals) of a meeting. Rather they look only at the facility cost. The facility cost has been estimated as accounting for only about 33 percent of the total cost of a typical meeting.

Second, the conventional method creates information flow inefficiencies. One way it does this is by limiting the amount of comparison cost information that planners have when selecting a meeting site. Planners rarely have the time or the access to the necessary information to find out if quoted prices are in line with market rates or reflect special price opportunities. For example, when facilities need to fill excess lodging capacity, they often offer low rates. However, facilities have no truly effective way of identifying the planners who need to plan a meeting during the time the special rate is in effect, or of providing the planners with enough information about the facility to pique their interest. Facilities are limited to direct mail and/or to advertising in publications that are read by meeting planners. Both of these approaches are very inefficient. Likewise, there is no easy way for meeting facilities to communicate to planners the value of cost factors like free airport shuttles or free meals.

Third, the current process is extremely slow. Finding a number of sites that meet a planner's qualifications can take hours or even days. Finding acceptable properties is and has been a manual process, often involving searching brochures, books, association memberships, and personal lists, and asking for recommendations from travel agents. Alternatively, online databases allow limited access to facility information. For example, certain hotel chains have started to put meeting capacity information for their affiliated properties on the Internet. Although these online databases generally allow planners to search for potential sites based on geography and required amenities, there is no reliable way to determine which facilities will be priced within the planner's budget. Also, most facilities must still be eliminated before a planner can effectively request cost information.

Accordingly, there is a need in the art to allow meeting planners to quickly and effectively compute an all-inclusive meeting cost for each of a large number of potential meeting facilities prior to defining geography and preferred amenities.

SUMMARY OF THE INVENTION

One computer implemented method for selecting a meeting facility for hosting a meeting consistent with the present invention comprises a plurality of steps. The steps include: (1) receiving a range of dates, a list of attendees of the meeting, and, an originating location for each of the attendees; (2) calculating an all-inclusive cost for hosting the meeting at each of a plurality of potential meeting facilities based on the specified range of dates and the specified list of attendees; and (3) ranking the plurality of potential meeting facilities based on the calculated all-inclusive costs.

A computer system consistent with the present invention comprises a processor, a network connection, and a memory. The memory includes instructions that when executed by the processor perform the functions of (1) receiving a request from a user via the network connection, the request including information defining minimum requirements of a meeting facility; (2) calculating an all-inclusive cost for a plurality of meeting facilities based on the received request; and (3) transmitting a list of a sub-set of the plurality of meeting facilities to the user, the sub-set being based on the calculated all-inclusive cost.

Another method consistent with the present invention comprising the steps of defining minimum requirements for the optimal meeting facility; transmitting the minimum requirements to an application server; and receiving a list of ranked meeting facilities, the list being ranked based on an all-inclusive cost calculation corresponding to an estimated total cost of holding the meeting at each meeting facility.

Another computer system consistent with the present invention includes an application server, a database, a meeting planner user agent processor, a meeting facility user agent processor, and a network connecting the meeting planner user agent processor, the meeting facility user agent processor, and the application server. The database stores information corresponding to a plurality of meeting facilities. The meeting planner user agent processor has an interface for accepting requests for a list of potential meeting facilities ranked according to an all-inclusive cost of hosting a meeting. The meeting facility user agent processor corresponds to at least one of the plurality of meeting facilities, the meeting facility user agent processor having an interface for accepting requests to modify information in the database relating to the meeting facility corresponding to the meeting facility user agent processor. The application server receives and processes the requests from the meeting planner user agent and the meeting facility user agent.

BRIEF DESCRIPTION OF THE DRAWINGS

The accompanying drawings, which are incorporated in and constitute a part of this specification, illustrate several embodiments consistent with this invention and, together with the description, help explain the principles of the invention. In the drawings.

FIGS. 6A and 6B illustrate pseudo-code showing methods consistent with the present invention;

FIGS. 11–14 are computer screen images of an exemplary user interface presented to a meeting planner.

DETAILED DESCRIPTION OF THE PREFERRED EMBODIMENTS

Reference will now be made in detail to embodiments of the invention, examples of which are illustrated in the accompanying drawings. Wherever possible, the same reference numbers will be used throughout the drawings to refer to the same or like parts.

Systems and methods consistent with the present invention enable a person planning a meeting to quickly and efficiently evaluate a large number of potential meeting facilities and generate an all-inclusive estimated cost for each facility to hold the meeting or conference. The all-inclusive cost estimate takes a number of factors into consideration, including, for example, location of the facilities, amenities offered by the facilities (e.g., whether golf courses are available nearby), date of the meetings, and number and origin of the meeting attendees. The person planning the meeting may then quickly and easily select the optimal facility for the upcoming meeting.

Figure 1:
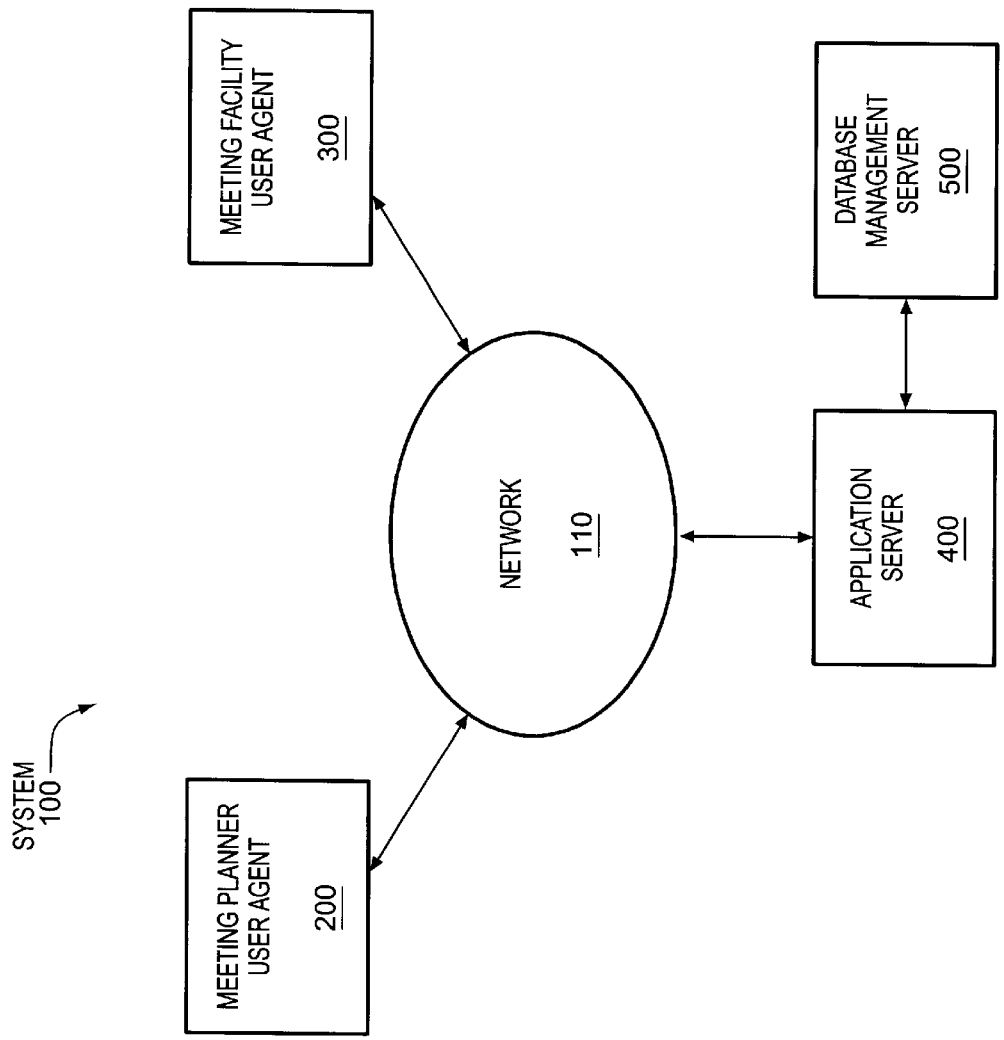
FIG. 1 is a conceptual overview of a system consistent with an aspect of the present invention.

FIGS. 1–5 are diagrams illustrating one system consistent with the present invention. A conceptual overview of the system is shown in FIG. 1.

System 100 includes a meeting planner user agent processor 200 (hereinafter "user agent" or "meeting planner user agent"), a meeting facility user agent processor (hereinafter "facility agent" or "meeting planner facility agent") 300, an application server 400, and a database management server (DBMS) 500. Network 110 allows meeting planner user agent 200, meeting facility user agent 300, and application server 400 to communicate with one another. Network 110 may be the Internet, a local area network (LAN), or a combination of the two. Additionally, the communication function provided by network 110 could also be provided by other types of networks, or by e-mail, the telephone, or postal mail. The link to the DBMS 500 from application server 400 may be a local area network. This link could also be provided by other means that allow for the transfer of the necessary information between DBMS 500 and application server 400.

Figure 2:
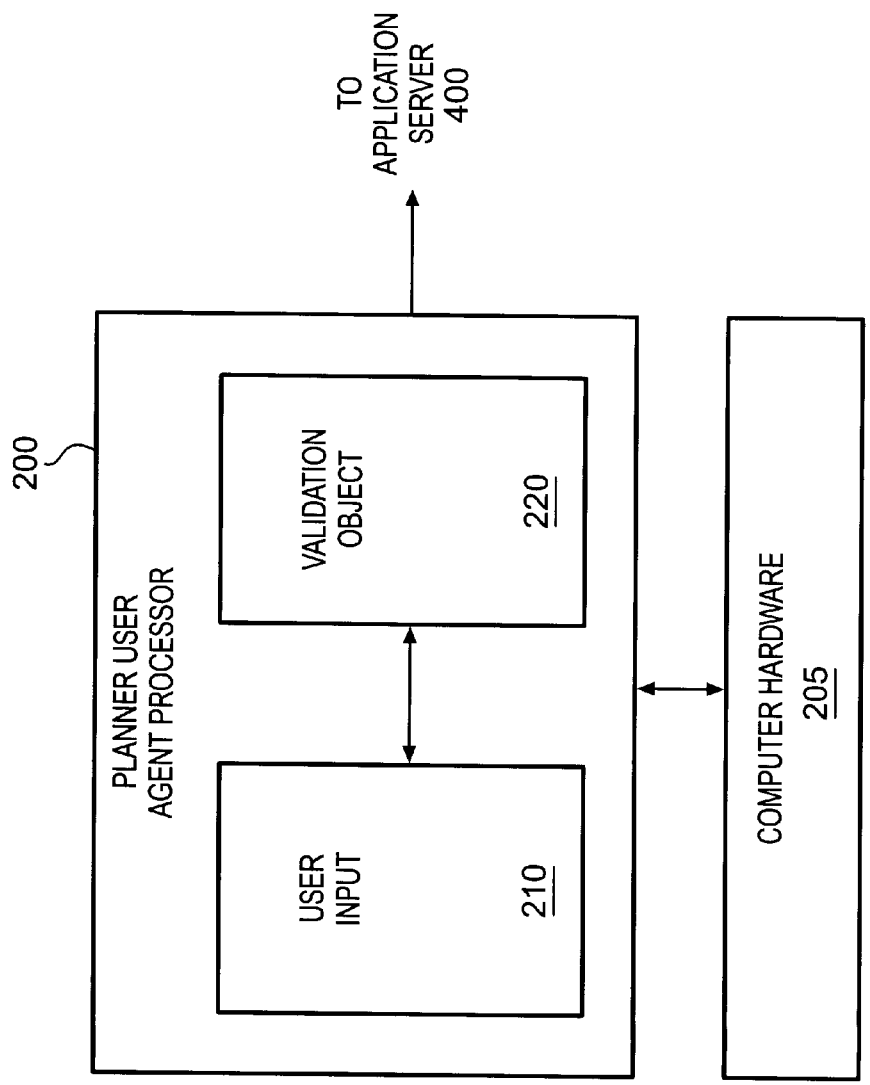
FIG. 2 is a block diagram illustrating the meeting planner user agent processor.

FIG. 2 is a block diagram illustrating meeting planner user agent 200 in more detail. The person planning the meeting interacts with meeting planner user agent 200, which acts as an interface between the person and application server 400. Meeting planner user agent 200 may be a standard Internet browser that permits user input through DHTML web pages 210 which have validation objects 220 that ensure the user input will be acceptable to the application server 400. User agents 200 may be a commercially available Internet browser such as Microsoft Internet Explorer or Netscape Navigator. User agent 200 executes on a computer 205. Computer 205 should have enough memory to execute user agent 200 and store and process requested DHTML web pages, including search results.

Figure 3:
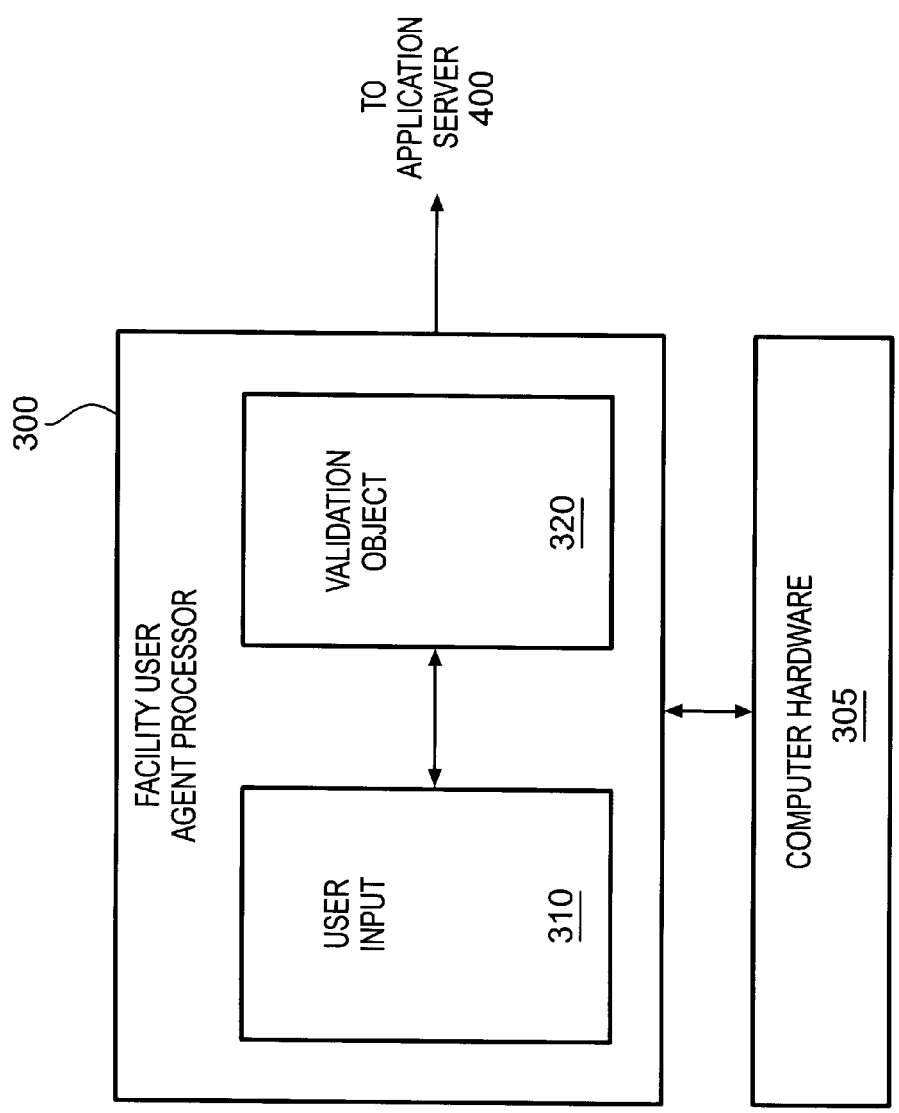
FIG. 3 is a block diagram illustrating the facility user agent processor.

FIG. 3 is a block diagram illustrating facility user agent 300 in more detail. Facility user agent 300 is similar in design to meeting planner user agent 200. The facility user agent acts as the interface between the meeting facility and the application server 400. As with meeting planner user agent 200, facility user agent 300 includes a user input section 310, such as the interface of a web browser, and a validation object 320, which ensures user input will be acceptable to application server 400. Agent 300 executes on computer 305. Through user input section 310, the facility may enter facility specific information including information such as rates, amenities, location, contact information, and meeting room sizes and capacities. This information is eventually stored in DBMS 500.

Facility agent 300 gives each facility the ability to change its profile, using a standard Internet browser, including rates, as needed. For example, if a hotel determines that it will likely have unused capacity during the month of October, it may reduce the rate it charges for guest or meeting rooms. This tends to improve the hotel's ranking in the search results, and thus improve the hotel's chances of attracting business. Conversely, if a hotel expects to be full during a given time period it may increase its rates for that time period or indicate that it does not have availability.

Figure 4:
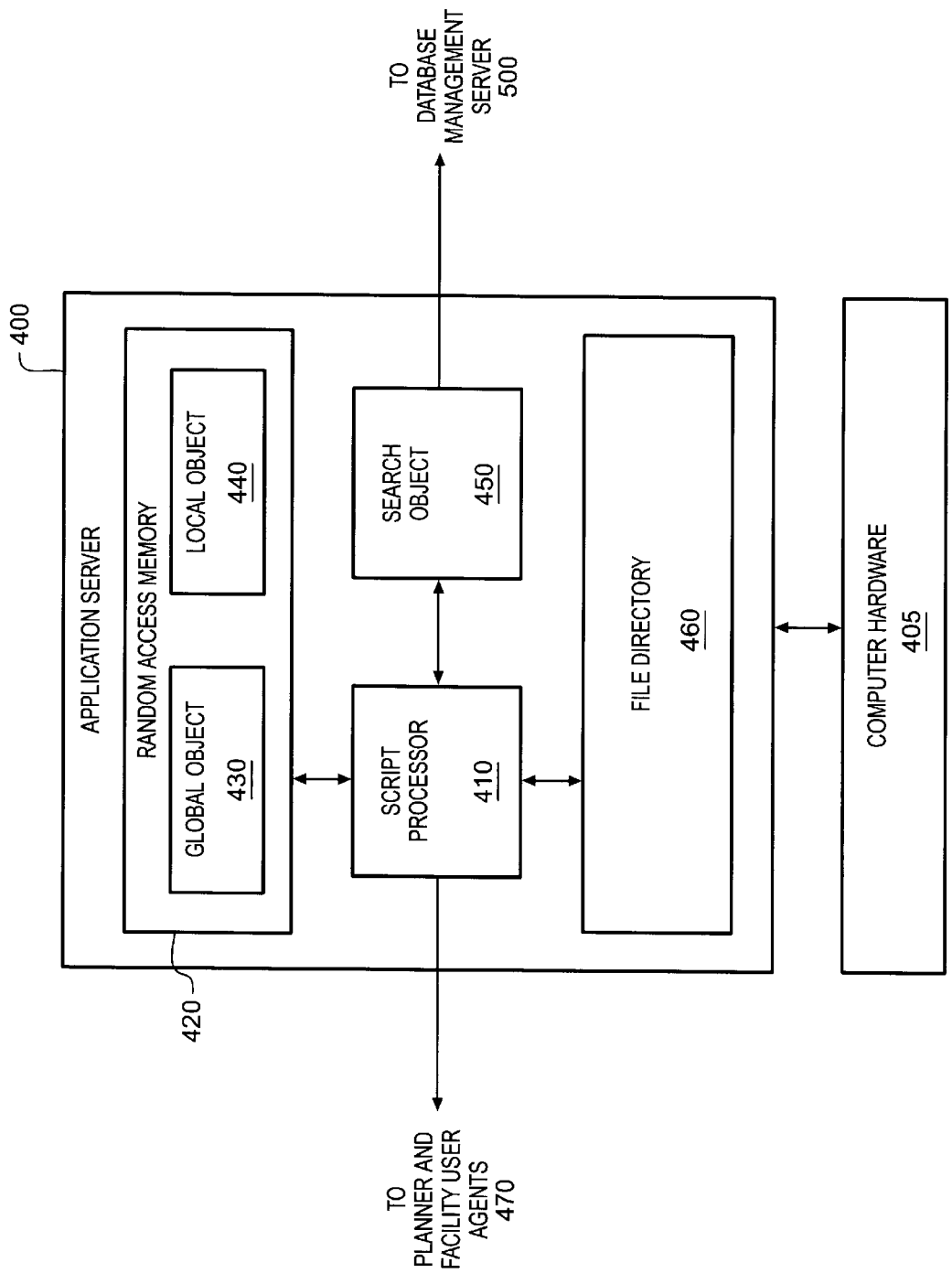
FIG. 4 is a diagram illustrating the application server.

FIG. 4 illustrates application server 400 in more detail. Application server 400 is a web server executing on a computer 405 with sufficient memory and processing capability to store a file directory 460, execute a script processor 410, instantiate a global object 430, a local object 440, and a search object 450. To increase speed, global object 430 and local object 440 are stored in random access memory 420. File directory 460 can be stored in a secondary memory such as on a hard disk drive.

Application server 400 acts as a central controller that takes information requests from meeting planner user agent 200 and generates corresponding requests to database management server (DBMS) 500. Using the information received from database management server 500, application server 400 calculates the all-inclusive meeting costs for the facilities desired by the planner. After calculating the all-inclusive meeting costs, application server 400 returns the search results to meeting planner user agent 200.

Application server 400 also acts as the interface through which meeting facility user agent 300 modifies its information relating to its meeting facility in DBMS 500. Application server 400, may be, for example, Microsoft Internet Information Server 4.0, although web servers with similar capabilities may also be used.

Script processor 410, in response to requests from agents 200 or 300, translates files from file directory 460 into HTML or DHTML format and transmits these web pages to user agents 200 and 300. Active Server Pages (ASP) may be used to implement the script processor, although other script processors such as CGI and PERL may also be used.

File directory 460 stores the web pages used to gather the information input from meeting planners and meeting facilities, as well as the user pages used to return information and search results back to the users.

Search object 450 performs the actual calculation of the all-inclusive meeting costs. In calculating the all-inclusive meeting cost, script processor 410 receives hotel selection criteria, attendee origin information, and meeting preferences for a search from meeting planner user agent 200 and requests information from DBMS 500. The resulting data is sent as parameters to search object 450, which then calculates the all-inclusive meeting costs. The results are ordered and stored in local object 440. The operator of search object 450 is discussed in more detail below.

Global object 430 is instantiated on the application server 400 and is accessible through script processor 410. Global object 430 consists of several arrays used by search object 450 that are loaded into RAM 420 in order to reduce the required communication between application server 400 and DBMS 500, and to increase the speed at which web pages are returned to the meeting planner or meeting facility.

These arrays contain information that is used globally across all searches. More particularly, the arrays include property arrays that include the following information for each of the facilities with profiles in DBMS 500: name, city, state, and quality rating.

Additionally, global object 430 contains arrays relating to the origin of attendees, metro area information, region information, and hotel chains. The information in global object 430 should generally be limited to non-volatile information or information that doesn't change frequently.

Local objects 440 store information specific to a particular meeting planner or meeting facility including a user profile, which may include such things as the meeting planner's or meeting facility's contact information and preferences. A local object 440, specific to each meeting planner, is loaded into RAM 420 each time a meeting planner logs on to application server 400.

Figure 5:
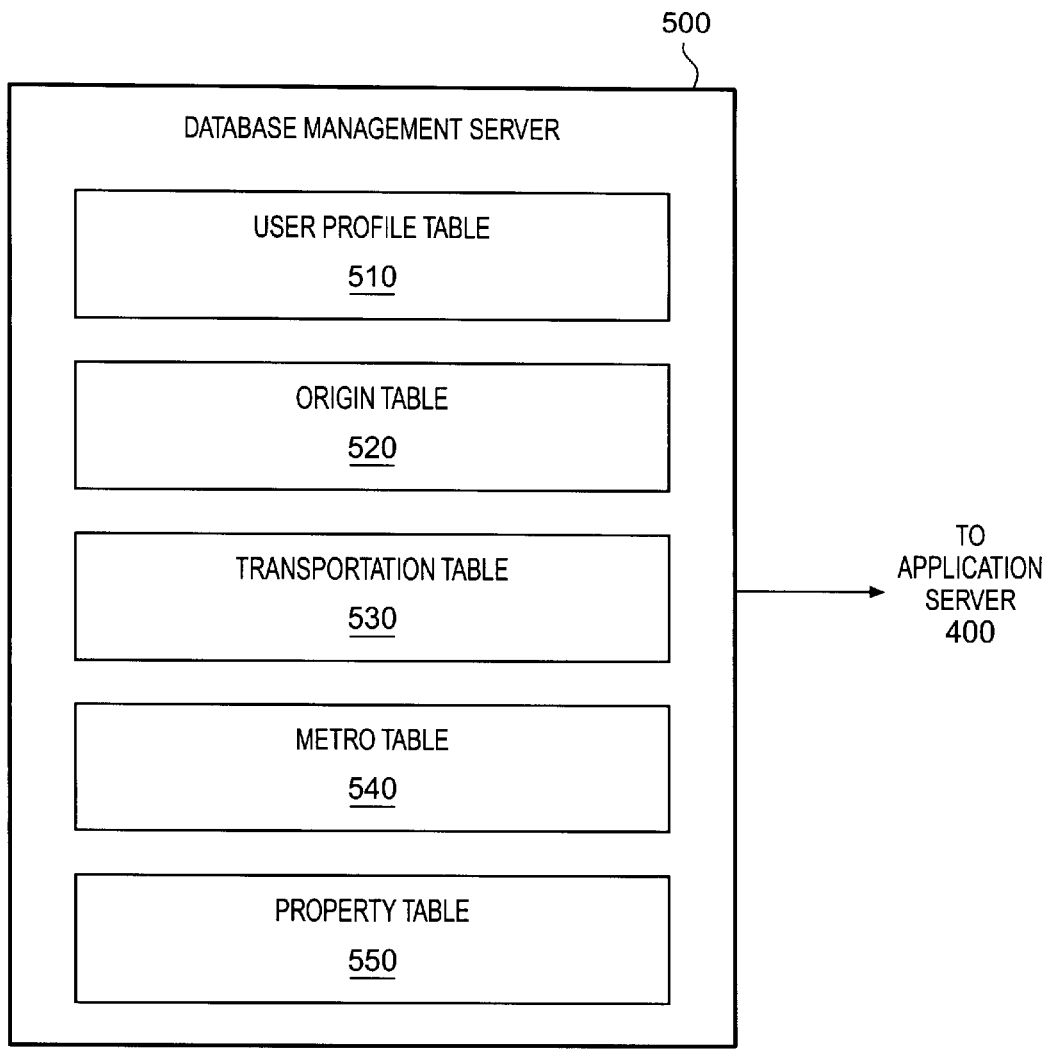
FIG. 5 is a diagram illustrating an exemplary composition of the database management server.

FIG. 5 is a diagram illustrating the database management server (DBMS) 500. The purpose of DBMS 500 is to store the data tables used in the calculation of the all-inclusive meeting cost and to store other information about each facility and the meeting planner. The user profile table 510 contains information specific to planners that are registered at application server 400. Origin tables 520 contain location information relating to the origination of attendees. Transportation tables 530 include information necessary in calculating the cost of getting attendees from their origin to their destination cities. Metro table 540 includes information specific to a given metro area, such as typical meal costs, taxi rates, public transportation costs, etc. Property table 550 includes information about meeting facilities used to calculate the all-inclusive meeting cost, as well as the quality, amenity, and meeting room information for each facility.

Several types of database management servers may be used to implement DBMS 500, such as Microsoft SQL Server.

FIGS. 6A and 6B contain pseudo-code illustrating in more detail methods consistent with the present invention for calculation of the all-inclusive meeting costs, as performed by search object 450. The pseudo-code is divided into three sections: a primary procedure 601 (called "Calculate") and two sub-procedures, procedures 602 and 603 (called "TransCost" and "GetDist"). The glossary at the end of this disclosure defines terms used in FIGS. 6A and 6B.

Procedure 601 calculates, for each facility being considered, the total meal cost, total lodging cost, and transportation cost for each attendee. From these costs, the all-inclusive meal cost is generated. Sub-procedures 602 and 603 are called by procedure 601. Sub-procedure 602 assists in calculating transportation costs and sub-procedure 603 assists in calculating distances between attendees and a facility. The details of the operation of procedures 601, 602, and 603 are shown in FIGS. 6A and 6B, and are thus not described further in this disclosure.

A more detailed description of the operation of system 100 will next be undertaken with reference to the flow charts of FIGS. 7–10.

Figure 7:
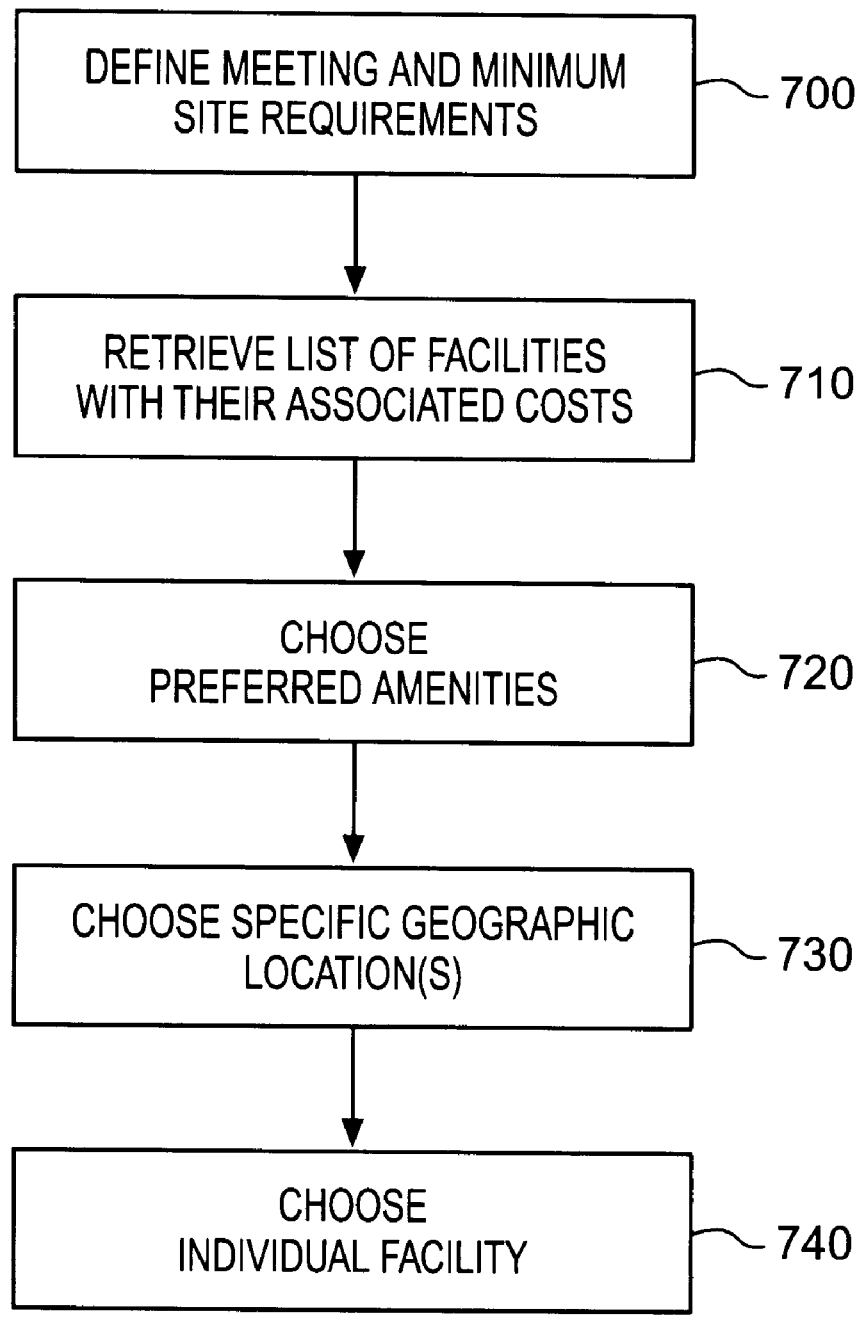
FIG. 7 is a flow chart illustrating methods for selecting a meeting facility.

FIG. 7 is a flow illustrating, at a high level, methods consistent with the present invention for selecting a meeting facility.

To begin, the meeting planner defines the meeting (step 700). This may include defining the purpose of the meeting, meeting objectives, the meeting audience, and choosing the preferred meeting dates. The planner may also enter a list of minimum site requirements (alternatively referred to herein as required amenities), such as hotel quality level, meeting room and guestroom capacities, and other items that are crucial to the success of the meeting. All of these variables are entered through user agent 200, which then requests a list of facilities and their associated costs from application server 400 (step 710). The list includes all facilities that meet the minimum site requirements specified by the planner. For example, if the purpose of the meeting is to inspect a company's manufacturing plant, one minimum requirement would be that the meeting facility be located close to the plant. If an objective of the meeting is to help attendees get to know each other better, and the planner feels this can best be done through a golf tournament, a minimum requirement might be a nearby golf course.

Providing the planner with an all-inclusive meeting costs for all the potential meeting facilities allows the planner to better understand the relationship between price and amenities. The planner may then choose which amenities he or she wants in a facility, (step 720), making the tradeoffs that provide the best meeting value. For example, if the planner were to compare properties on the waterfront to properties near water but not directly on the waterfront, he might find that the value provided by a waterfront property is less than the increase in price the planner must pay. In this case, the planner would choose a facility not located directly on the waterfront.

By the time the planner understand what amenities he or she wants in a property, he or she will also know what cities or specific geographic locations offer the best value. The planner then chooses acceptable geographic locations (step 730).

The order of steps 720 and 730 is reversible. If a planner believes location is more important than amenities, he or she might switch the order of steps 720 and 730. Either way, the planner is given the all-inclusive meeting cost information before making the decisions about non-required amenities and location, so that he or she has a broad enough selection of potential meeting facilities to find the best value by trading off amenities and location with cost.

Finally, the planner selects an individual facility for the meeting (step 740). This may be done using one or more of several online and off-line methods and tools. For example, the planner may use a standard electronic request for proposal.

Figure 8:
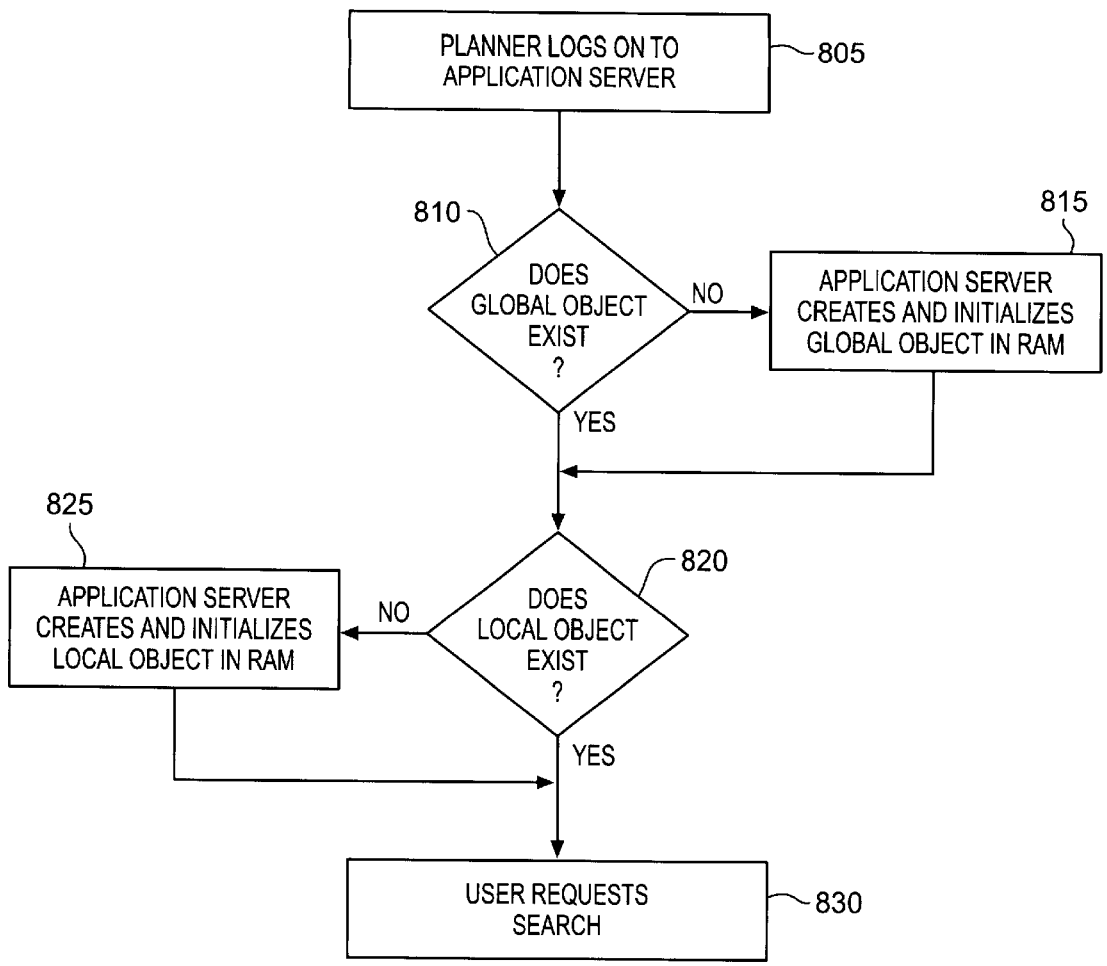
FIG. 8 is a flow chart illustrating methods performed by the application server when processing search requests.

FIG. 8 is a flow chart illustrating methods performed by application server 400 when processing search requests. The planner logs on to application server 400 by supplying a user name and password (step 805). The application server 400 checks to make sure the global object 430 is loaded into RAM 420 (step 810). If the global object 430 is not loaded, the application server 400 creates it based on information from DBMS 500 (step 815). Preferably, as long as there is one active meeting planner or meeting facility logged onto application server 400, global object 430 remains in random access memory RAM. Consequently, it does not have to be reloaded for each new user. The application server 400 then checks to see if the local object 440 for that specific user exists (step 820). If the local object 440 does not exist, the application server 400 requests the user profile from DBMS 500 and creates and initializes the local object 440 (step 825). Once both the global 430 and local objects 440 are loaded and initialized the meeting planner can request a new search (step 830).

Figure 9:
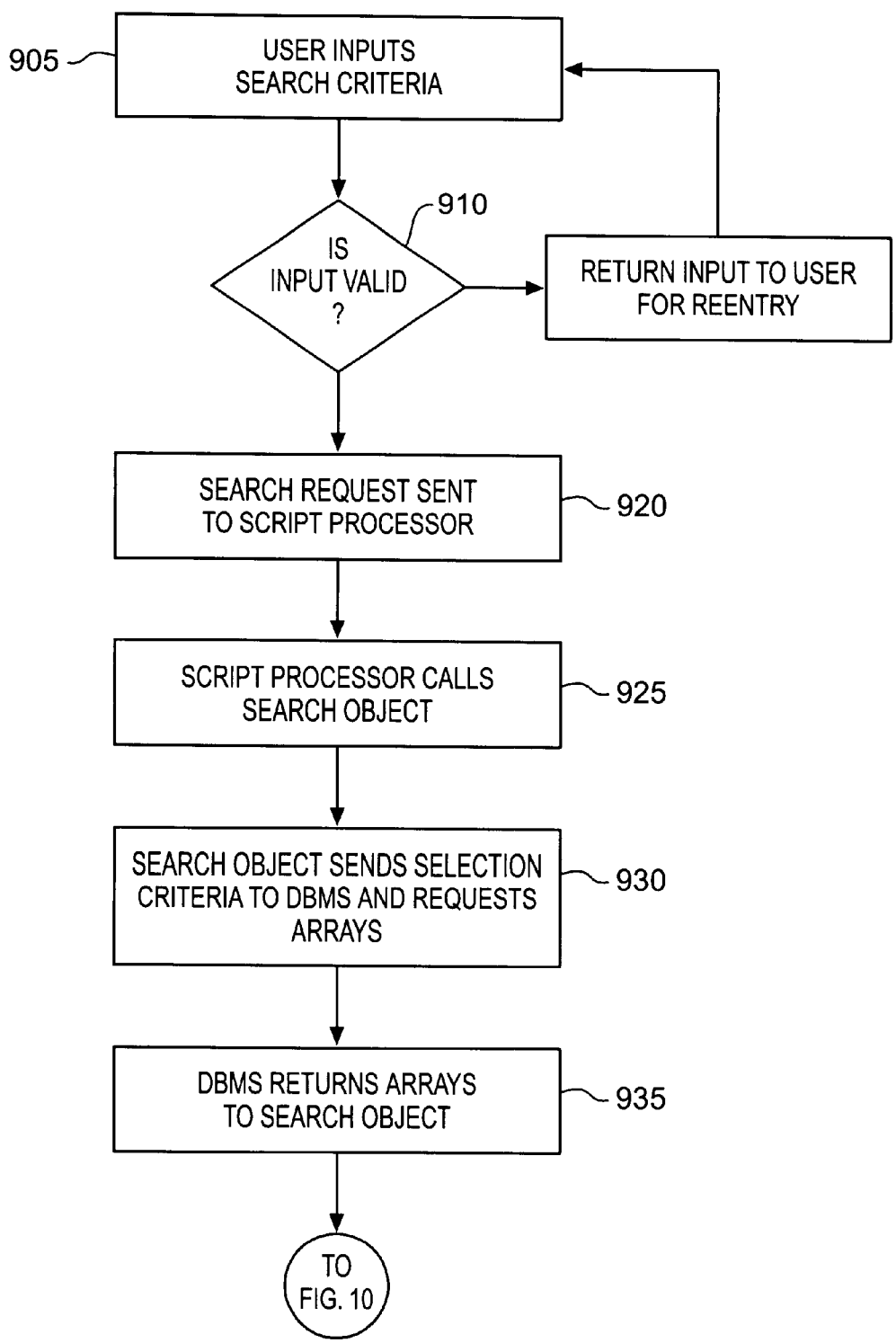
FIGS. 9 and 10 are flow charts illustrating calculation of an all-inclusive meeting cost.
Figure 10:
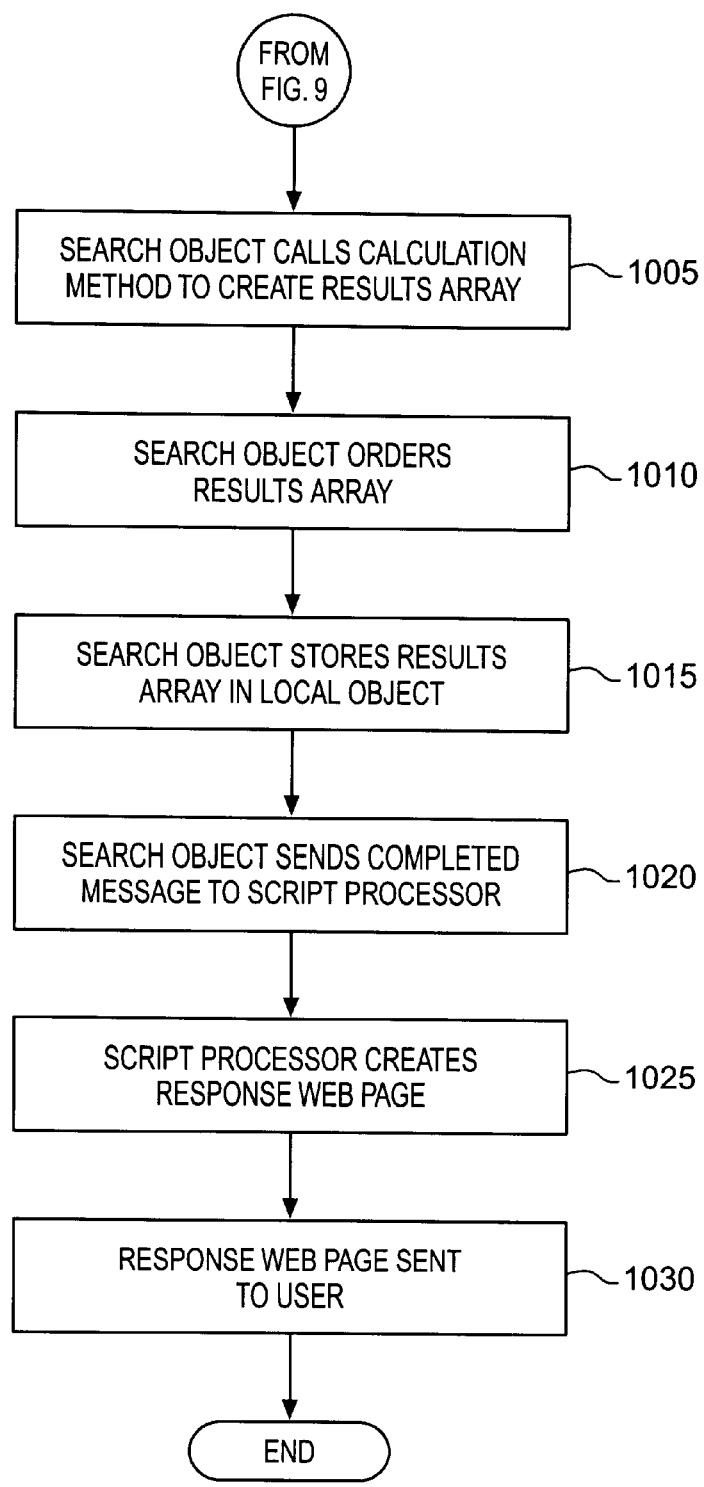

FIGS. 9 and 10 are flow charts illustrating the process of calculating the all-inclusive meeting cost. The meeting planner begins by providing search criteria, including attendee origin information (both origin location and number of attendees from each location), preferred meeting dates, and other meeting requirements, as appropriate, through web pages received by the meeting planner's user agent 200 (step 905). Once the information is entered, it is validated (step 910). The validation object 220 verifies that the information is in a form acceptable to the application server 400. If the input validates correctly, it is sent to the script processor 410 (step 920). If the input does not validate correctly, it is returned to the user for correction and reentry (step 915). With the correct input information, the script processor 410 calls the search object 450 (step 925). The search object 450 then creates the appropriate property arrays from DBMS 500 based on the search criteria (step 930).

For example, if the search criteria states that there are 200 attendees who must stay in a single hotel, the property array would only consist of hotels with a minimum of 200 guestrooms and adequate meeting space. Or if the search criteria states that hotels must have a Mobil Star rating of 3 or higher, the property array would only include hotels with at least that rating. The DBMS 500 returns the appropriate data to the search object (step 935).

With the appropriate arrays stored in memory, search object 450 calls the "Calculation" method (step 1005) (the "Calculation" method is shown in FIGS. 6A and 6B) to create a results array. Once the search object 450 has calculated the all-inclusive meeting cost, it sorts the results arrays (step 1010), based on, for example, lowest cost. Search object 450 then stores the sorted results arrays in local object 440, (step 1015), and sends a completion message to the script processor 410 (step 1020).

When the script processor 410 receives the completion message, it creates a response web page which includes the all-inclusive meeting costs, detailed cost breakouts for each facility, and property information (step 1025). The script processor 410 then sends the response page to the meeting planner (step 1030).

When the planner receives the results, he or she can sort and/or filter them based on available amenities, cost and quality. More importantly, the planner has the necessary information to find the meeting site that offers the best value.

As an example of the operation of system 100, consider the following. A meeting planner wants to hold a meeting for 52 people on Sep. 23–25, 1999. He goes to the web site of the application server on his Internet browser, and enters that he has fifteen attendees coming from Chicago, twelve attendees coming from Atlanta, ten attendees coming from Los Angeles, eight attendees coming from Seattle, and seven attendees coming from Dallas. He also enters the dates on which he would like to hold the meeting. From previously entered preferences, the application server knows that this meeting planner wants to see only hotels that have at least a three star quality rating. He might also enter other minimum requirements. In this case, assume that the meeting is intended as a training class for marine biologists. As part of the class, attendees need access to a large body of water with fish in it. This body of water could be a lake or an ocean. Consequently, the meeting planner indicates to the application server that he needs a hotel located on the waterfront. The application server calculates the all-inclusive meeting cost (i.e., cost of transportation to the origin airport, airfare or driving to the destination city, local transportation within the destination city, lodging, meeting room rental, meals/food, incidentals, and miscellaneous) on the preferred dates for each hotel located on the waterfront, with meeting room and guestroom capacity for 52 attendees that has a three star rating or above. If the meeting cost would be lower due to cheaper airfare, lower guestroom rates, complimentary meals, or less expensive meeting room rental, for alternative dates around the time of the preferred dates, the application server may determine this. The application server may then return to the meeting planner a list of the hotels ranked by cost, and indicate which alternative dates could reduce the cost of the meeting.

If the meeting planner prefers to have the meeting at a location with golf nearby, he compares the cost of hotels in his results set with golf nearby to the cost of hotels without golf. After reviewing the information on the hotels and the meeting costs, the meeting planner chooses one or more hotels he determines offer the best values given what they offer in terms of location, amenities, and all-inclusive meeting cost. He then contacts these hotels to negotiate a final deal.

Instead of calling the hotels to negotiate a final deal, the planner may request bids from the hotels using an electronic request for proposal. This relieves the planner of the burden of having to call each selected meeting facility in order to get an official price quote from the facility for hosting the meeting. With an electronic request for proposal, the planner sends the final candidate list of meeting facilities and any other information the meeting facilities must have before they can quote the planner an official price to the application server. The application server receives this information and handles the contacting of the meeting facilities for the planner. Typically, the application server does this by organizing the information, and either e-mailing or faxing it to each candidate hotel. Similarly, the meeting planner may electronically purchase airline tickets using an on-line reservation system, or even reserve hotel and meeting room space through an on-line reservation system.

FIGS. 11–14 are screen shots of an exemplary user interface presented to a meeting planner by meeting planner user agent 200. Through the user interface, the meeting planner enters information such as the number and location of the attendees, the meeting dates, and amenity information. As previously mentioned, the user interface is preferably generated by a web browser program receiving DHTML pages from application server 400. One of ordinary skill in the art will appreciate that the images of the interfaces shown in FIGS. 11–14 are exemplary only, and that many variations on the user interface or on the technology used to implement the user interface are possible while still falling within the scope of the concepts covered by the present invention.

Figure 11:
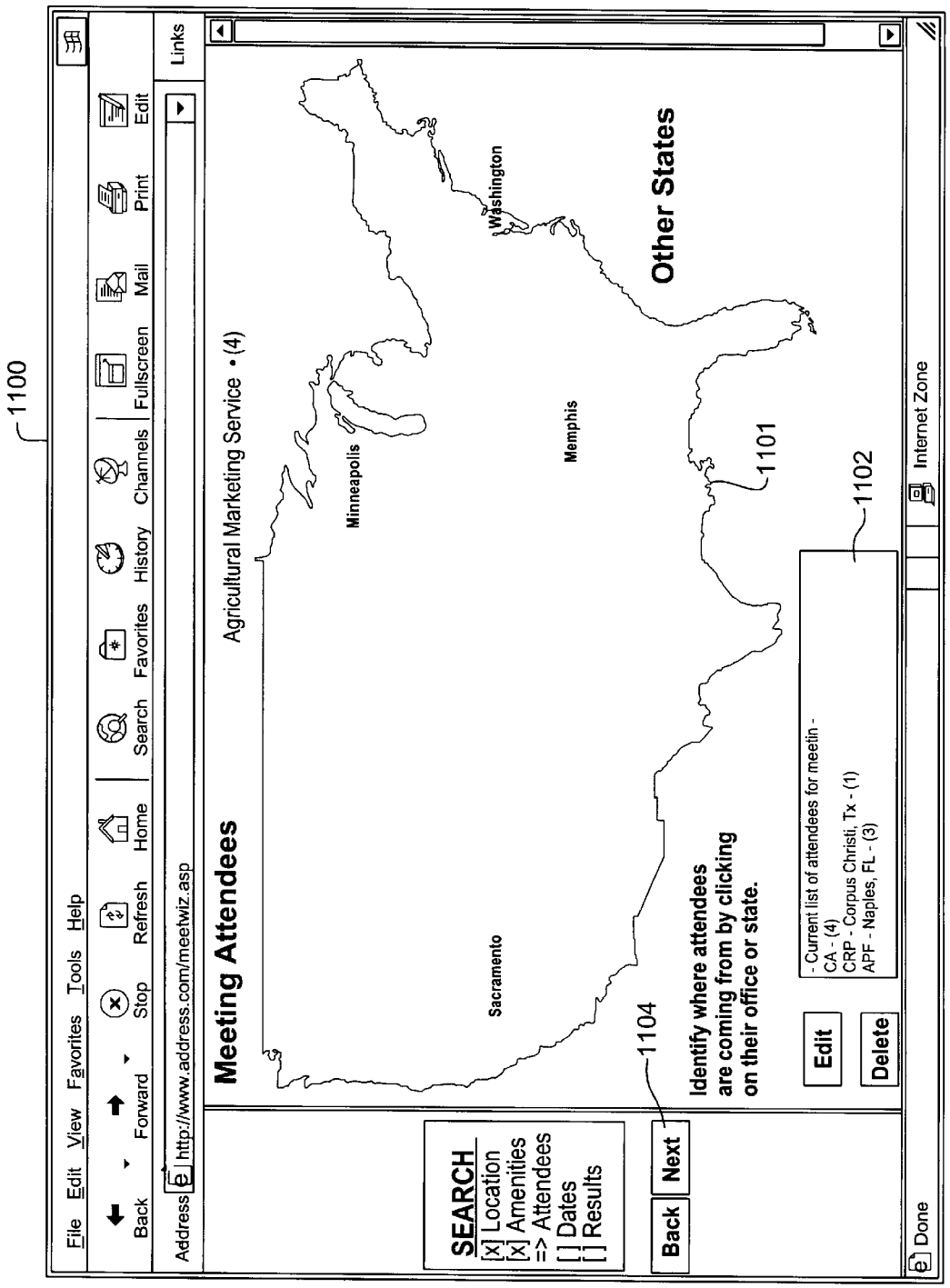

FIG. 11 is an image of the user interface through which the meeting planner enters a list of attendees and their corresponding originating locations. Browser 1100 displays the DHTML image from application server 400. The meeting planner uses map 1101 by clicking on the state that the attendee(s) originate from, and selecting the nearest office or airport to the attendees in that state. A dialog box (not shown) queries the user for the number of attendees coming from that location. Box 1102 lists the attendees selected and their originating locations. As shown, seven attendees have been entered: four from California, four from Corpus Christi, Tex., and three from Naples, Fla. The meeting planner presses the next buffon 1104 when all the attendees have been entered.

Figure 12:
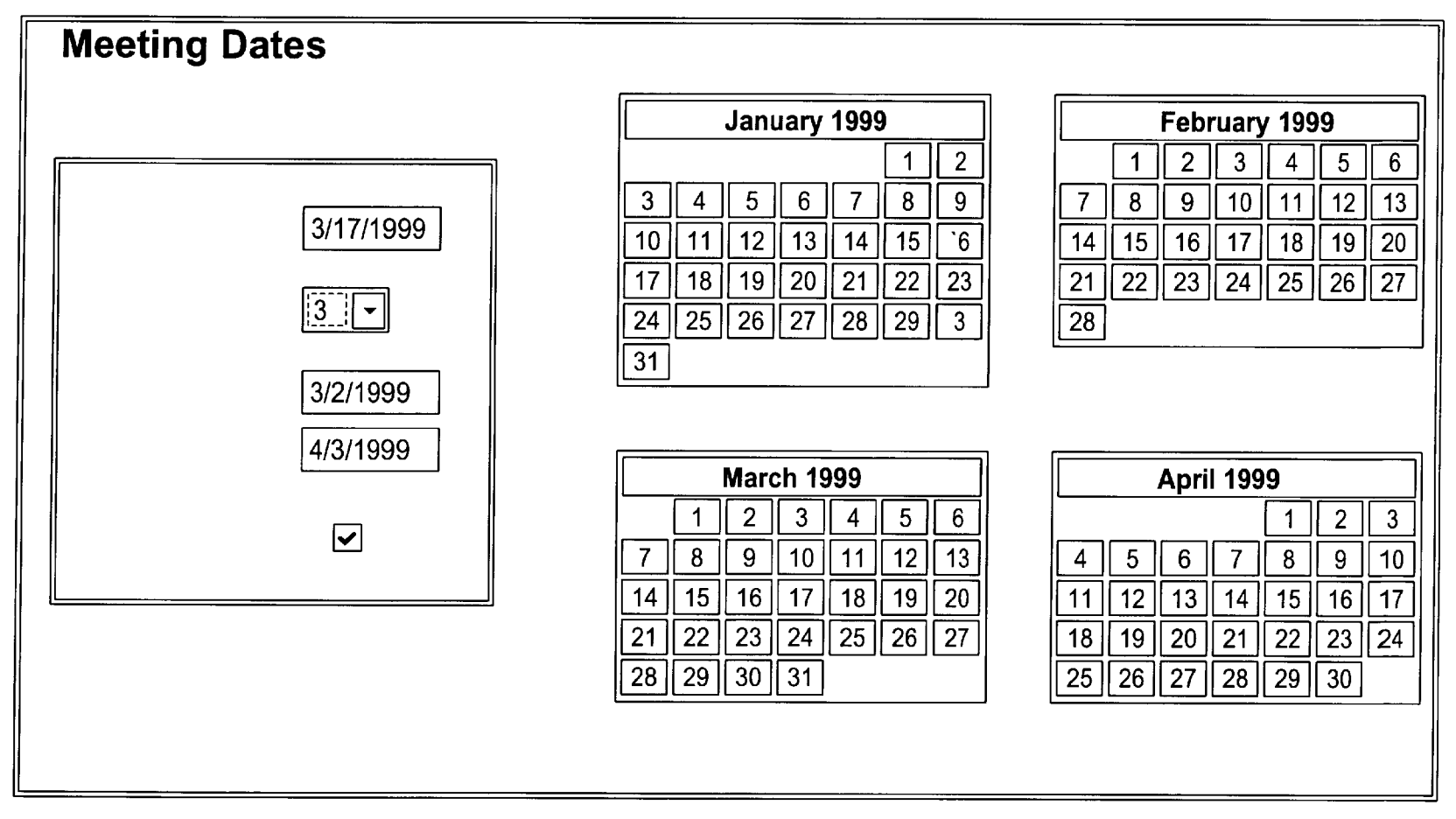

FIG. 12 is an image of the user interface used to enter the preferred dates of the meeting. As well as entering the start date, and the length of the meeting, the meeting planner may enter the earliest possible start date and the latest possible end date.

FIG. 13 is an image of an exemplary meeting facility list returned by application server 400. A plurality of hotels 1301 are listed along with their location, quality rating, special rate dates, and estimated total cost 1302. Hotels are ranked by estimated all-inclusive total cost 1302. The hotel with the lowest total estimated cost is listed first. The meeting planner may optionally request pop-up window 1303, through which additional required amenities can be entered. When additional required amenities are applied, application server 400 filters the list of hotels 1301 and returns only those hotels that contain the required amenities. Preferably, when the meeting planner may selects the "Quality Rating" hyperlink, the system will sort the meeting facility list based on the quality rating preassigned to each facility.

FIG. 14 is a list of an updated search result list returned by application server 400. The updated list includes a plurality of hotels 1402 that include the selected required amenities such as restaurant on premises and golf nearby. The planner selects the check boxes 1403 of the hotels (i.e., meeting facilities) for which the planner is interested in viewing more detailed information.

In summary, the systems and methods described herein allow a meeting planner to quickly and efficiently select a facility for a particular conference or meeting. By combining transportation, lodging, meeting room, and food and beverage costs for each of a large number of meeting facilities, and when appropriate over a broad geographic area, planners are able to find the lowest total cost meeting. Moreover, individual costs are optimized. Based on distance to be traveled, the present invention determines if it makes sense for attendees to fly or drive to the meeting. For those who are to travel by air, the present invention checks both costs across airlines and across airport pairs, choosing both the lowest cost airline and the lowest cost airport pair. For example, a traveler might have the option of flying from Chicago to Dallas using American, United, or Southwest. Flying out of O'Hare, the traveler might be able to take American to Dallas/Fort Worth International Airport for $350 roundtrip. The same trip on United might cost $320. However, the traveler can also take an American flight from Chicago Midway into Love Field for $310. Last of all, the traveler can fly from Chicago Midway to Dallas Love Field for $250. The system may look at all these scenarios, combine them with the cost of getting to and from each airport, and choose the lowest cost airport pair—in this case Southwest from Midway to Love Field for $250 dollars. The system also determines the cost of getting from the destination airport to the meeting facility using the meeting facility's shuttle, renting a car, taking a taxi, or using another alternative transportation, and recommends that attendees use the lowest cost option. It also factors the lowest cost option into the all-inclusive meeting cost. Moreover, the system can search a range of dates to determine if there are other dates close to the preferred dates that would offer either lower airfare, guestroom rates, or meeting room rental.

In addition, the systems and methods described herein help planners compare costs across similar properties with one or two different amenities or that are in different geographies. By giving planners the ability to filter properties based on the types of amenities they offer, planners can evaluate the cost of these amenities, and determine if these amenities or the geography add enough value to justify the cost. Similarly, because planners are told where each property is located, they can determine differences in various geographic locations.

The system can also sort properties by quality level below a maximum cost. As a result, planners can compare the difference in price for a five star hotel versus a similar three or four star hotel. If the price is similar, or the planner feels the difference in the cost is justified, the planner can reserve space at the higher quality.

Finally, the systems and methods described herein make it easy for meeting facilities to sell to planners based on total value. Currently, it is difficult for planners to understand the real worth of complimentary meals, or of less expensive airfare into a given city, as most planners do not have an all-inclusive budget which they can use to evaluate the value of these benefits. Because properties are ranked based on cost, if a given facility offers advantages or benefits that improve overall value, the planner sees a lower all-inclusive meeting cost for that hotel, and the hotel receives a better ranking in the search results. For example, hotels in Las Vegas offer lower room rates than many comparable hotels because the lower room revenue can be offset with gaming revenue. In addition, Las Vegas, Nevada has relatively inexpensive flights between most major destinations. Both of these factors are taken into account in the all-inclusive meeting cost, and as a result, Las Vegas hotels tend to rank higher than similar hotels that can't reduce their room rates, and don't have access to the same low cost flights.

It will be apparent to those skilled in the art that various modifications and variations can be made to the present invention without departing from the scope or spirit of the invention. For example, although the facility selection systems and methods were described primarily as an on-line (e.g. Internet) device, concepts consistent with the present invention can also be applied to off-line applications in which the application server is contacted using, for example, the telephone system or postal mail.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

Glossary of terms for FIGS. 6a and 6b:

AirfareArray—Contains the one-way airfare between each pair of airports stored in the AirportArray.

AirportArray—Contains names, addresses, latitude and longitude for each airport that serves each origin and each potential destination. Also contains cost of travel between each airport and the properties it serves.

AirTranArray—Contains the transportation cost from a particular hotel to all the airports it serves.

AltOffTrans—One way cost per person of alternate transportation between a given office and hotel.

AttendeeArray—Contains the number of attendees coming from each origin location, the type of origin and the origin transportation costs.

Breakfast—Expected cost of breakfast in a given metro area.

Complimentary Meals—Value of meals offered for free by the property (hotel).

ConferenceArray—Contains the capacities and conference room rates for every conference room at each of the properties being considered.

ConfRate—Daily room rental rate for a given conference room.

DestTrans—One—way cost of traveling from destination airport to hotel. This value is calculated and stored in the AirTranArray.

Dinner—Expected cost of dinner in a given metro area.

EffectEnd—Date on which an estimated cost expires.

EffectStart—Date on which an estimated cost becomes valid.

ExtraDay—Extra day of lodging and meals given to attendees living far enough away from a potential meeting location to justify traveling to the meeting the night before it starts.

ExtraDayDist—Distance attendees must live from a potential meeting facility to justify traveling to the meeting the night before it starts.

FilterValue—Contains a bit mask indicating which amenities each property offers. Once the results have been returned to the meeting planner, the FilterValue allows the meeting planner to filter the properties based on the amenities they offer.

FirstDay%—Percentage of expected meal cost that is allotted to non-local attendees on the first day in the destination city (i.e., assumes that non-local attendees eat some percentage of their meals prior to leaving home).

Guestroom Rate—Daily rate for one sleeping room at the hotel. Depending on the meeting planners' preferences, this rate can be for a single, double room or a suite.

HotelID—Primary key—Identification number given to each property that is unique to that property in the PropertyArrays.

HotelResultsArray—Contains results (expected meeting cost) for each property that meets minimum requirements where the meeting is to be held at the hotel.

Incidentals—Expected cost of incidentals in a given metro area.

LastDay%—Percentage of expected meal cost that is allotted to non-local attendees on the last day of the meeting (i.e., assumes that non-local attendees eat some percentage of their meals after they return home).

Local—Number of attendees that will attend a meeting but are located too close to need lodging or meals.

LocalDist—Maximum distance attendees may live from a given property and still be considered local.

LocalMeal%—Percentage of expected meal cost given to local attendees on each day of the meeting.

LocalTrans—One—way cost of traveling from the hotel where attendees are lodging to the office where the meeting is actually held.

Lunch—Expected cost of lunch in a given city.

MaxCost—Maximum daily amount meeting planner is willing to spend on lodging and meals for a visitor to the meeting.

MaxOffDist—Maximum distance that a hotel may be from a given office to be considered as a place where attendees can lodge if the meeting is held at the office.

Meal End—Date on which an expected meal cost expires.

MealArray—Contains the expected seasonal meal cost for each metro area.

MealID—Primary Key—Identification number given to the expected cost of meals in for a given city.

MealStart—Date on which an expected meal cost becomes valid.

MetroArray—Contains for each metro area the expected taxi rates, and cost of alternative transportation.

MileReimburse—Amount per mile reimbursed to attendees for using their personal vehicles for business travel.

MiscExpense—Given as a percentage of total amount of the meeting cost. Represents the portion of total meeting costs that are generally not accounted for in the other itemized expenses.

NumAttendees—The total number of attendees coming from a given origin location.

NumDays—Length in days of the meeting.

OffDist—Distance between hotel where attendees are lodging and office where meeting is held.

OfficeID—Primary Key—Identification number given to each office location that is unique to that office.

OfficeArray—Contains the name and location, including latitude and longitude, for each office where attendees might originate or at which they might hold a meeting.

OfficeResultsArray—Contains the result (expected meeting cost) for each office and hotel combination that meets the minimum meeting requirements.

OneWayAir—One—way cost of air travel between a given pair of airports.

OnTime—Number of non-local attendees that will be arriving at hotel the same day the meeting starts.

OriginArrays—Includes the name and location, including latitude and longitude, for each origin location. In the current embodiment of the present invention, the OriginArrays consist of the OfficeArray and the AirportArray.

OriginTrans—Cost of transportation between the origin point and the origin airport. This value is calculated and stored in the AttendeeArray.

PropEnd—Date on which a given lodging rate for a given hotel expires.

PropertyArrays—Contains all the necessary information for each of the potential meeting properties, including name, city, state, latitude, longitude, amenities, transportation costs to airports, lodging rate, etc.

PropLatitude—Latitude for a given property.

PropLongitude—Longitude for a given property.

PropStart—Date on which a given lodging rate for a given hotel becomes valid.

Quality—Quality rating for a given property.

RateID—Primary Key—Identification number given to each rate (both lodging and conference) that is unique to that rate.

Taxi—Rate charged by the taxi per mile. May also include a flat rate for getting into the taxi that is added to the total of the rate multiplied by the mileage.

TotalCost—Represents the all-inclusive expected meeting cost at a given property.

TotalDrive—Total cost incurred from driving to and from the meeting.

TotalTrans—Total transportation expenses associated with the meeting.

TransportationArrays—Contains information required to compute transportation cost for the meeting, including the AirfareArray, rental car rates, mileage reimbursement, etc.

UserProfile—Contains an individual users' account information including preferences such as MaxCost, MaxOffDist, Local Distance, LocalMeal%, FirstDay%, LastDay%, etc.

Visitors—Number of non-local attendees who will be attending the meeting and require guestrooms and meals.

What is claimed is:

1. A computer implemented method of selecting a meeting facility for hosting a meeting, the method comprising:
receiving a range of dates, a list of attendees of the meeting, and an originating location for each of the attendees;
calculating an all-inclusive cost for hosting the meeting at each of a plurality of potential meeting facilities based on the specified range of dates and the specified list of attendees;
ranking the plurality of potential meeting facilities based on the calculated all-inclusive costs;
receiving a list of preferences and geographic locations corresponding to the ranked plurality of potential meeting facilities; and
removing facilities from the ranked plurality of potential meeting facilities which do not contain the preferences and which do not correspond to the geographic locations specified in the received list of preferences and geographic locations.

2. The method of claim 1, wherein the calculating further includes estimating a cost for each said attendee to travel to each of the plurality of facilities.

3. The method of claim 1, wherein the calculating further includes estimating a meal cost for each attendee at each of the plurality of facilities.

4. The method of claim 1, wherein the calculating further includes estimating a lodging cost for each attendee at each of the plurality of facilities.

5. The method of claim 1, wherein the calculating further includes estimating a conference room cost for the meeting.

6. The method of claim 1, wherein the calculating the all-inclusive cost for hosting the meeting includes calculating optimized costs and summing the calculated optimized costs.

7. The method of claim 6, wherein calculating optimized costs includes calculating a minimum cost for ground transportation to and from airports.

8. The method of claim 6, wherein calculating optimized costs includes finding a lowest airfare among airport pairs corresponding to a first airport from a set of airports near an origin location of the attendees and a second airport from a set of airports near a destination location of the attendees.

9. The method of claim 6, wherein calculating optimized costs includes calculating a minimum costs for a plurality of ranges of dates.

10. A computer system comprising:
a processor;
a network connection; and
a memory, the memory including instructions that when executed by the processor perform selection if a meeting facility for hosting a meeting by (1) receiving a range of dates, a list of attendees of the meeting, and an originating location for each of the attendees, (2) calculating an all-inclusive cost for hosting the meeting at each of a plurality of potential meeting facilities based on the specified range of dates and the specified list of attendees, (3) ranking the plurality of potential meeting facilities based on the calculated all-inclusive costs, (4) receiving a list of preferences and geographic locations corresponding to the ranked plurality of potential meeting facilities, and (5) removing facilities from the ranked plurality of potential meeting facilities which do not contain the preferences and which do not correspond to the geographic locations specified in the received list of preferences and geographic locations.

11. The system of claim 10, wherein the memory further includes instructions for ranking the plurality of potential meeting facilities based on the calculated all-inclusive costs and selecting the sub-set based on the ranking.

12. The system of claim 10, wherein the memory further includes instructions for ranking the plurality of potential meeting facilities based on a predetermined quality rating of the meeting facilities.

13. The system of claim 10, wherein the memory further includes instructions for calculating the all-inclusive cost based on at least a range of dates, a list of attendees of the meeting, and, for each of the attendees on the list, an originating location.

14. The system of claim 13, wherein the instructions for calculating the all-inclusive cost further perform the function of querying a database for information relating to the plurality of meeting facilities.

15. A method of evaluating a plurality of potential meeting facilities for an optimal meeting facility, the method comprising:
defining minimum requirements for the optimal meeting facility;
transmitting the minimum requirements to an application server;
receiving a list of ranked meeting facilities, the list being ranked based on all-inclusive cost calculation corresponding to an estimated total cost of holding the meeting at each meeting facility;
choosing preferences for meeting facilities from the list of ranked meeting facilities;
choosing specific geographic locations corresponding to a geographic location of at least one of the meeting facilities in the list;

transmitting the preferences and the specific geographic location to the application server; and receiving an updated list of meeting facilities from the application server based on the chosen preferences and geographic locations.

16. The method of claim 15, further comprising:

choosing one or more of the meeting facilities from the updated list and making a reservation at the chosen facility via an electronic request for proposal.

17. A computer readable medium containing instructions that when executed by a processor causes the processor to perform selection of a meeting facility for hosting a meeting by:

receiving a range of dates, a list of attendees of the meeting, and an originating location for each of the attendees;

calculating an all-inclusive cost for hosting the meeting at each of a plurality of potential meeting facilities based on the specified range of dates and the specified list of attendees;

ranking the plurality of potential meeting facilities based on the calculated all-inclusive costs;

receiving a list of preferences and geographic locations corresponding to the ranked plurality of potential meeting facilities; and removing facilities from the ranked plurality of potential meeting facilities which do not contain the preferences and which do not correspond to the geographic locations specified in the received list of preferences and geographic locations.

18. The computer readable medium of claim 17, wherein the calculating further includes estimating a cost for each said attendee to travel to each of the plurality of facilities.

19. The computer readable medium of claim 17, wherein the calculating further includes estimating a meal cost for each attendee at each of the plurality of facilities.

20. The computer readable medium of claim 17, wherein the calculating further includes estimating a lodging cost for each attendee at each of the plurality of facilities.

21. The computer readable medium of claim 17, wherein the calculating further includes estimating a conference room cost for the meeting.

22. The computer readable medium of claim 17, wherein the calculating the all-inclusive cost for hosting the meeting includes calculating optimized costs and summing the calculated optimized costs.

23. The computer readable medium of claim 22, wherein calculating optimized costs includes calculating a minimum cost for ground transportation to and from airports.

24. The computer readable medium of claim 22, wherein calculating optimized costs includes finding a lowest airfare among airport pairs corresponding to a first airport from a set of airports near an origin location of the attendees and a second airport from a set of airports near a destination location of the attendees.

25. The computer readable medium of claim 22, wherein calculating optimized costs includes calculating a minimum costs for a plurality of ranges of dates.

26. A computer readable medium containing instructions that when executed by a processor causes the processor to evaluate a plurality of potential meeting facilities for an optimal meeting facility by:

defining minimum requirements for the optimal meeting facility;

transmitting the minimum requirements to an application server;

receiving a list of ranked meeting facilities, the list being ranked based on all-inclusive cost calculation corresponding to an estimated total cost of holding the meeting at each meeting facility;

choosing preferences for meeting facilities from the list of ranked meeting facilities;

choosing specific geographic locations corresponding to a geographic location of at least one of the meeting facilities in the list;

transmitting the preferences and the specific geographic location to the application server; and receiving an updated list of meeting facilities from the application server based on the chosen preferences and geographic locations.

27. The computer readable medium of claim 26, further comprising:

choosing one or more of the meeting facilities from the updated list and making a reservation at the chosen facility via an electronic request for proposal.

28. A computer system comprising:

a processor;

a network connection; and a memory, the memory including instructions that when executed by the processor evaluate a plurality of potential meeting facilities for an optimal meeting facility by:

defining minimum requirements for the optimal meeting facility;

transmitting the minimum requirements to an application server;

receiving a list of ranked meeting facilities, the list being ranked based on all-inclusive cost calculation corresponding to an estimated total cost of holding the meeting at each meeting facility;

choosing preferences for meeting facilities from the list of ranked meeting facilities;

choosing specific geographic locations corresponding to a geographic location of at least one of the meeting facilities in the list;

transmitting the preferences and the specific geographic location to the application server; and receiving an updated list of meeting facilities from the application server based on the chosen preferences and geographic locations.

29. The system of claim 28, further comprising:

choosing one or more of the meeting facilities from the updated list and making a reservation at the chosen facility via an electronic request for proposal.

\* \* \* \* \*